United States Patent
Fukushima et al.

(10) Patent No.: US 8,551,349 B2
(45) Date of Patent: Oct. 8, 2013

(54) METHOD FOR PRODUCING MAGNETIC RECORDING MEDIUM, AND MAGNETIC RECORDING/REPRODUCING APPARATUS

(75) Inventors: Masato Fukushima, Ichihara (JP); Akira Sakawaki, Ichihara (JP); Akira Yamane, Ichihara (JP)

(73) Assignee: Showa Denko K.K., Tokyo (JP)

( * ) Notice: Subject to any disclaimer, the term of this patent is extended or adjusted under 35 U.S.C. 154(b) by 343 days.

(21) Appl. No.: 12/810,772

(22) PCT Filed: Dec. 24, 2008

(86) PCT No.: PCT/JP2008/073415
§ 371 (c)(1), (2), (4) Date: Jun. 25, 2010

(87) PCT Pub. No.: WO2009/081932
PCT Pub. Date: Jul. 2, 2009

(65) Prior Publication Data
US 2010/0277829 A1    Nov. 4, 2010

(30) Foreign Application Priority Data
Dec. 26, 2007 (JP) .................. 2007-333492

(51) Int. Cl.
G11B 5/84 (2006.01)
(52) U.S. Cl.
USPC .................. 216/22; 216/41; 216/49; 216/51; 216/67; 216/75; 427/130
(58) Field of Classification Search
None
See application file for complete search history.

(56) References Cited

U.S. PATENT DOCUMENTS

| | | | | |
|---|---|---|---|---|
| 5,123,376 A * | 6/1992 | Kaneko et al. | ................. | 118/718 |
| 5,990,060 A * | 11/1999 | Ohmi et al. | .................... | 510/175 |
| 6,168,845 B1 * | 1/2001 | Fontana et al. | ............... | 428/836 |
| 6,383,597 B1 * | 5/2002 | Fullerton et al. | ........... | 428/836.1 |
| 6,841,224 B2 | 1/2005 | Kamata et al. | | |
| 7,043,823 B2 * | 5/2006 | Childress et al. | .......... | 29/603.07 |
| 7,067,207 B2 | 6/2006 | Kamata et al. | | |

(Continued)

FOREIGN PATENT DOCUMENTS

CN 101038752 A 9/2007
JP 61-162824 A 7/1986

(Continued)

OTHER PUBLICATIONS

Japanese Office Action issued in corresponding Japanese Application No. 2007-333492 dated Oct. 9, 2012.

(Continued)

*Primary Examiner* — Anita Alanko
(74) *Attorney, Agent, or Firm* — Sughrue Mion, PLLC

(57) ABSTRACT

A method for producing a magnetic recording medium having a magnetically partitioned magnetic recording pattern on at least one surface of a nonmagnetic substrate, characterized by comprising a step of reacting portions of a magnetic layer, formed on the non-magnetic substrate, with ozone to modify magnetic properties of said portions of the magnetic layer for forming the magnetically partitioned magnetic recording pattern. The magnetic layer can be a two-layer structure comprising a magnetic layer having a granular structure and formed thereon a magnetic layer having a non-granular structure. The produced magnetic recording medium exhibits a greatly enhanced recording density while recording/reproducing characteristics equal to or better than those of the heretofore proposed magnetic recording mediums are maintained, and it can be produced with an enhanced efficiency.

8 Claims, 5 Drawing Sheets

(56) References Cited

U.S. PATENT DOCUMENTS

| | | | |
|---|---|---|---|
| 7,147,790 B2 | 12/2006 | Wachenschwanz et al. | |
| 7,166,261 B2 * | 1/2007 | Kamata et al. | 423/138 |
| 7,549,209 B2 | 6/2009 | Wachenschwanz et al. | |
| 8,120,869 B2 * | 2/2012 | Fukushima | 360/48 |
| 8,206,602 B2 * | 6/2012 | Kimura et al. | 216/22 |
| 8,263,190 B2 * | 9/2012 | Fukushima et al. | 427/539 |
| 2002/0142192 A1 | 10/2002 | Kamata et al. | |
| 2004/0091748 A1 | 5/2004 | Kamata et al. | |
| 2004/0101713 A1 | 5/2004 | Wachenschwanz et al. | |
| 2004/0244684 A1 | 12/2004 | Tsunoda et al. | |
| 2005/0120545 A1 | 6/2005 | Wachenschwanz et al. | |
| 2005/0241578 A1 * | 11/2005 | Aoki et al. | 118/697 |
| 2005/0271819 A1 * | 12/2005 | Wago et al. | 427/259 |
| 2005/0284842 A1 * | 12/2005 | Okawa et al. | 216/22 |
| 2007/0217075 A1 * | 9/2007 | Kamata et al. | 360/135 |
| 2010/0006537 A1 * | 1/2010 | Kamata et al. | 216/22 |
| 2010/0214694 A1 * | 8/2010 | Kimura et al. | 360/135 |
| 2010/0302679 A1 | 12/2010 | Kamata et al. | |
| 2011/0051282 A1 * | 3/2011 | Fukushima | 360/75 |

FOREIGN PATENT DOCUMENTS

| | | |
|---|---|---|
| JP | 05-205257 A | 8/1993 |
| JP | 06-131658 A | 5/1994 |
| JP | 11-096553 A | 4/1999 |
| JP | 2002-359138 A | 12/2002 |
| JP | 2004-164692 A | 6/2004 |
| JP | 2004-178793 A | 6/2004 |
| JP | 2004-178794 A | 6/2004 |
| JP | 2006-031849 A | 2/2006 |
| JP | 2006-278622 A | 10/2006 |
| JP | 2007-133940 A | 5/2007 |
| JP | 2008-097679 A | 4/2008 |

OTHER PUBLICATIONS

English-language translation of Chinese Office Action issued in corresponding Chinese Application No. 200880127437.4 dated Dec. 12, 2011.

Taiwanese Office Action issued in corresponding Taiwanese Application No. 10120893040 dated Aug. 30, 2012.

First Office Action of Chinese Patent Application No. 2008801274374, Issue date Dec. 19, 2011.

* cited by examiner

Step A

Step B

Step C

Step D

Step E

Step F

Step G

Step H

Step I

METHOD FOR PRODUCING MAGNETIC RECORDING MEDIUM, AND MAGNETIC RECORDING/REPRODUCING APPARATUS

TECHNICAL FIELD

This invention relates to a process for producing a magnetic recording medium used for a magnetic recording/reproducing apparatus such as a hard disk apparatus. It further relates to a magnetic recording/reproducing apparatus.

BACKGROUND ART

In recent years, magnetic recording apparatuses such as a magnetic disk apparatus, a flexible disk apparatus and a magnetic tape apparatus are widely used with their importance being increasing. Recording density of a magnetic recording medium used in the magnetic recording apparatus is greatly enhanced. Especially, since the development of MR head and PRML technique, the areal recording density is more and more increasing. Recently GMR head and TMR head have been developed, and the rate of increase in the areal recording density is about 100% per year. There is still increasing a demand for further enhancing the recording density, and therefore, a magnetic layer having a higher coercive force, and a higher signal-to-noise ratio (SNR) and a high resolution are eagerly desired.

An attempt of increasing the track density together with an increase of a liner recording density to enhance an areal recording density is also being made.

In a recent magnetic recording apparatus, the track density has reached about 110 kTPI. However, with an increase of the track density, magnetic recording information is liable to interferring with each other between adjacent tracks, and magnetization transition regions in the boundary regions thereof as a noise source tend to impair the SNR. These problems result in lowering in bit error rate and impede the enhancement of the recording density.

To enhance the areal recording density, it is required to render small the size of each recording bit and give the maximum saturated magnetization and magnetic film thickness to each recording bit. However, with a decrease in the bit size, the minimum magnetization volume per bit becomes small, and the recorded data are tend to disappear due to magnetization reversal caused by heat fluctuation.

Further, in view of the reduction in distance between the adjacent tracks, a high-precision track servo system technology is required for the magnetic recording apparatus, and an operation is generally adopted wherein recording is carried out widely but the reproduction is carried out narrowly so that the influence of the adjacent tracks is minimized. This operation is advantageous in that the influence of the adjacent tracks can be minimized, but it is disadvantageous in that the reproduction output is rather low. This also leads to difficulty in enhancement of the SNR to a desired high level.

To reduce the heat fluctuation, maintain the desired SNR and obtain the desired reproduction output, a proposal has been made wherein elevations and depressions are formed, which extend along the tracks on a surface of a magnetic recording medium, so that each of patterned tracks on the elevations is partitioned by the depressions whereby the track density is enhanced. This type of magnetic recording media is hereinafter referred to as a discrete track media, and the technique for providing this type of magnetic recording media is hereinafter referred to as a discrete track method.

A known example of the discrete track medium is a magnetic recording medium disclosed in, for example, patent document 1, which is made by providing a non-magnetic substrate having elevations and depressions formed on the surface thereof, and the magnetic layer corresponding surface configuration is formed on the non-magnetic substrate, to give physically discrete magnetic recording tracks and servo signal patterns.

The above-mentioned magnetic recording medium has a structure such that a ferromagnetic layer is formed via a soft magnetic underlayer on the non-magnetic substrate having elevations and depressions formed on the surface thereof, and an overcoat is formed on the ferromagnetic layer. The magnetic recording pattered regions form magnetic recording regions on the elevations physically partitioned from the surrounding regions.

In the above-mentioned magnetic recording medium, the occurrence of ferromagnetic domain wall in the soft magnetic underlayer can be prevented or minimized and therefore the influence due to the heat fluctuation is reduced and the interfere between the adjacent signals is minimized with the result of provision of a magnetic recording medium having a large SNR.

The discrete track method includes two type of methods: a first type is drawn to a method wherein tracks are formed after the formation of a multilayer magnetic recording medium comprising several laminated films; and a second type is drawn to a method wherein patterns having elevations and depressions are formed directly on a substrate or formed on a film layer for forming tracks thereon, and then a multilayer magnetic recording medium is formed using the patterned substrate or the patterned film layer (see, for example, patent document 2 and patent document 3). The first type method is often called a magnetic layers-treating type method, and the second type method is often called as an embossing type method.

Another discrete track method has been proposed in patent document 4. In the proposed method, a previously formed magnetic layer is, for example, subjected to an implantation of nitrogen ion or oxygen ion or irradiated with laser whereby regions partitioning magnetic tracks in a discrete track medium are formed.

Further, a method of producing a magnetic recording medium has been proposed, which comprises a step of subjecting a magnetic layer to an ion milling using a carbon mask (see patent document 5).

Further, another method for forming a magnetic pattern has been proposed in patent document 6, which comprises a step of forming a ferromagnetic layer comprising at least one element selected from Fe, Co and Ni, a step of selectively masking the surface of the ferromagnetic layer, a step of exposing the regions of the surface of ferromagnetic layer, which have been exposed by the selective masking, to a halogen-containing reactive gas whereby the ferromagnetic layer and an under layer are chemically reacted with an active ingredient in the reactive gas in said exposed regions of ferromagnetic layer to be thereby rendered non-ferromagnetic regions.

Patent document 1 JP 2004-164692 A1
Patent document 2 JP 2004-178793 A1
Patent document 3 JP 2004-178794 A1
Patent document 4 JP H5-205257 A1
Patent document 5 JP 2006-31849 A1
Patent document 6 JP 2002-359138 A1

DISCLOSURE OF THE INVENTION

Problems to be Solved by the Invention

Attempts have been heretofore made to form a magnetically partitioned magnetic recording pattern, but problems arose in these attempts. For example, in the case when regions of a magnetic layer are irradiated with a laser or implanted with an oxygen ion or other ions for modifying the magnetic properties of said regions of magnetic layer, the modified regions tend to be damaged and the surface thereof is sometimes roughened. Further, the irradiation with a laser and the implantation of oxygen ion or other ions have a low treating efficiency and this leads to reduction in productivity of a magnetic recording medium. In the case when regions of a magnetic layer are halogenated for modifying the magnetic properties of said regions of magnetic layer, it tends to give a damage to adjacent layers. Therefore, the halogenation is difficult to adopt in practice.

In view of the heretofore proposed magnetic recording mediums which are still faced with a technical problem for further increasing a recording density, a primary object of the present invention is to provide a method of producing an improved magnetic recording medium, which exhibits a greatly enhanced recording density while recording/reproducing characteristics equal to or better than those of the heretofore proposed magnetic recording mediums are ensured, and which method enables the production of such improved magnetic recording medium with an enhanced efficiency.

Means for Solving the Problems

Researches, made by the inventors, for achieving the above-mentioned object revealed that the above-mentioned improved magnetic recording medium can be produced by the following methods. Thus, the present invention has been completed.

In accordance with the present invention, there are provided the following methods for producing a magnetic recording medium.

(1) A method for producing a magnetic recording medium having a magnetically partitioned magnetic recording pattern on at least one surface of a nonmagnetic substrate, characterized by comprising a step of reacting portions of a magnetic layer, formed on the non-magnetic substrate, with ozone to modify magnetic properties of said portions of the magnetic layer for forming the magnetically partitioned magnetic recording pattern.

(2) A method for producing a magnetic recording medium as described in (1) above, characterized by comprising the following seven steps (A) through (G) carried out in this order:

(A) a step of forming a magnetic layer on at least one surface of a non-magnetic substrate, (B) a step of forming a mask layer on the magnetic layer, (C) a step of forming a resist layer on the mask layer, (D) a step of forming a negative pattern of the magnetic recording pattern on the resist layer, (E) a step of removing portions of the mask layer in regions corresponding to the negative pattern of the magnetic recording pattern, (F) a step of contacting regions of the magnetic layer, which have been exposed by the removal of the portions of the mask layer in step (E), with ozone whereby said regions of the magnetic layer are reacted with ozone to modify the magnetic properties in said regions of the magnetic layer, and (G) a step of removing the residual mask layer, or the residual mask layer and resist layer.

(3) A method for producing a magnetic recording medium as described in (2) above, wherein, prior to contacting said exposed regions of the magnetic layer with ozone in step (F) to modify the magnetic properties in said regions of the magnetic layer, surface layer portions in said exposed regions of the magnetic layer are removed.

(4) A method for producing a magnetic recording medium as described in (2) above, wherein, prior to contacting said exposed regions of the magnetic layer with ozone in step (F) to modify the magnetic properties in said regions of the magnetic layer, the following procedure (i) or procedures (ii) are carried out.

(i) a procedure of exposing said exposed regions of the magnetic layer to a fluorine-containing gas, (ii) procedures of removing surface layer portions in said exposed regions of the magnetic layer, and then, exposing said exposed regions of the magnetic layer to a fluorine-containing gas.

(5) A method for producing a magnetic recording medium as described above in any one of (1) to (3), wherein the magnetic layer to be contacted with ozone in step (F) has a granular structure comprised of magnetic particles surrounded by an oxide.

(6) A method for producing a magnetic recording medium as described in (5) above, characterized by comprising the following nine steps (A1) through (G1) carried out in this order:

(A1) a step of forming, on at least one surface of a non-magnetic substrate, a magnetic layer having a granular structure comprised of magnetic particles surrounded by an oxide, (A2) a step of forming a magnetic layer having a non-granular structure on the magnetic layer having a granular structure, (B1) a step of forming a mask layer on the magnetic layer having a non-granular structure, (C1) a step of forming a resist layer on the mask layer, (D1) a step of forming a negative pattern of the magnetic recording pattern on the resist layer, (E1) a step of removing portions of the mask layer in regions corresponding to the negative pattern of the magnetic recording pattern, (E2) a step of removing portions of the magnetic layer having a non-granular structure in regions corresponding to the negative pattern of the magnetic recording pattern, (F1) a step of contacting regions of the magnetic layer having the granular structure, which have been exposed by the removal of portions of the magnetic layer having a non-granular structure in step (E2), with ozone whereby the magnetic layer having the granular structure is reacted with ozone to modify the magnetic properties in said regions of the magnetic layer having the granular structure, and (G1) a step of removing the residual mask layer, or the residual mask layer and resist layer.

(7) A method for producing a magnetic recording medium as described in (6) above, wherein, prior to contacting said exposed regions of the magnetic layer having the granular structure with ozone in step (F1) to modify the magnetic properties in said regions of the magnetic layer, surface layer portions in said exposed regions of the magnetic layer having the granular structure are removed.

(8) A method for producing a magnetic recording medium as described in (6) above, wherein, prior to contacting said exposed regions of the magnetic layer having the granular structure with ozone in step (F1) to modify the magnetic properties in said regions of the magnetic layer having the granular structure, the following procedure (i) or procedures (ii) are carried out.

(i) a procedure of exposing said exposed regions of the magnetic layer having the granular structure to a fluorine-containing gas, (ii) procedures of removing surface layer portions in said exposed regions of the magnetic layer having the granular structure, and then, exposing said exposed regions of the magnetic layer having the granular structure to a fluorine-containing gas.

(9) A method for producing a magnetic recording medium as described above in any one of (3), (4), (7) and (8), wherein the surface layer portion of the magnetic layer to be removed has a thickness in the range of 0.1 nm to 15 nm.

(10) A method for producing a magnetic recording medium as described above in any one of (1) to (9), wherein the reaction of said regions of the magnetic layer with ozone is effected by contacting said exposed regions of the magnetic layer with ozone gas or a liquid containing ozone gas.

(11) A method for producing a magnetic recording medium as described above in any one of (2) to (10), wherein the mask layer is formed from carbon.

(12) A method for producing a magnetic recording medium as described in (11) above, wherein the carbon mask layer formed has a thickness in the range of 5 nm to 40 nm.

(13) A method for producing a magnetic recording medium as described above in any one of (2) to (12), wherein the formation of the negative pattern of the magnetic recording pattern on the resist layer in step (D) or (D1) is carried out by transfer printing using a stamp.

(14) A method for producing a magnetic recording medium as described above in any one of (2) to (13), which further comprises:

(H) a step of, after step (G) or (G1) for removing the residual resist layer, or the residual resist layer and mask layer, etching a surface layer portion of the magnetic layer by using an inert gas.

In accordance with the present invention, there is further provided the following magnetic recording/reproducing apparatus.

(15) A magnetic recording/reproducing apparatus characterized by comprising, in combination, the magnetic recording medium produced by the method as mentioned above in any one of (1) to (14); a driving part for driving the magnetic recording medium in the recording direction; a magnetic head comprising a recording part and a reproducing part; means for moving the magnetic head in a relative motion to the magnetic recording medium; and a recording-and-reproducing signal treating means for inputting signal to the magnetic head and for reproducing output signal from the magnetic head.

Effect of the Invention

According to the present invention drawn to a method for producing a magnetic recording medium wherein a magnetic layer is formed on a non-magnetic substrate and then a magnetic recording pattern is formed on the magnetic layer, a magnetic recording medium can be provided with a high production efficiency which is characterized in that a good head-floatability is ensured, and the magnetic recording pattern is partitioned by the regions exhibiting excellent partitionability and the signal interferes occurring between the adjacent partitioned regions in the magnetic recording pattern are suppressed, and that a high recording density can be achieved.

In the method of the present invention, the mask layer is removed in regions corresponding to the negative pattern of the magnetic recording pattern, and then the thus-exposed regions of the magnetic layer are contacted with ozone whereby said regions of magnetic layer are reacted with ozone to modify the magnetic properties in said regions of magnetic layer. Therefore the magnetic recording pattern of the magnetic layer becomes sharp and the resulting magnetic recording medium exhibits excellent fringe characteristics. That is, when writing is made in a track and the read output (i.e., initial read output) is measured, and further, writing is made repeatedly, for example, 1,000 times in the adjacent tracks, and the read output of the first track is measured, the latter read output is lower than the initial read output only to a very minor extent.

When the regions of the magnetic layer to be exposed to ozone are formed by using a resist layer and a mask layer comprised of carbon, and by conducting patterning of the resist layer and the mask layer by a dry etching technique using a $SiO_2$-containing material and $O_2$ gas, especially a reactive ion etching or a reactive ion milling, the thus-formed regions of the magnetic layer are defined with high precision by precipitous walls of the mask layer.

Further according to the present invention, a magnetic recording/reproducing apparatus can be provided, which is equipped with the above-mentioned magnetic recording medium, and thus, exhibits good head-floatability, and the magnetic recording pattern is partitioned with excellent partitionability and the signal interferes occurring between the adjacent partitioned regions are suppressed, and thus, which apparatus has high recording density characteristics.

REFERENCE NUMERALS

Figure 1:
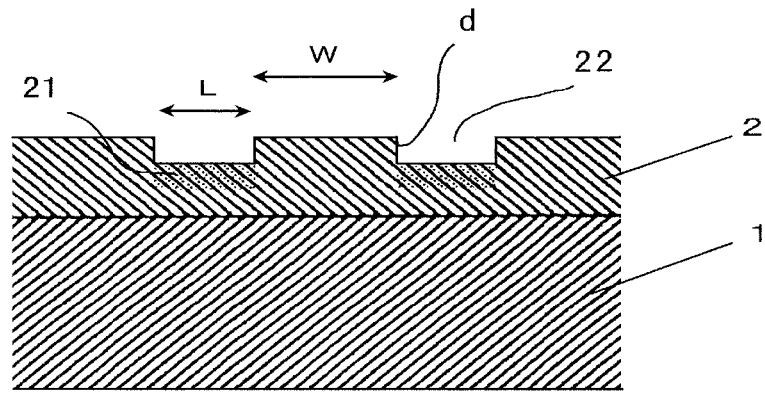
FIG. 1 illustrates a cross-section of one example of a laminate structure comprising a substrate and a magnetic layer in the magnetic recording medium manufactured according to the present invention.
Figure 2:
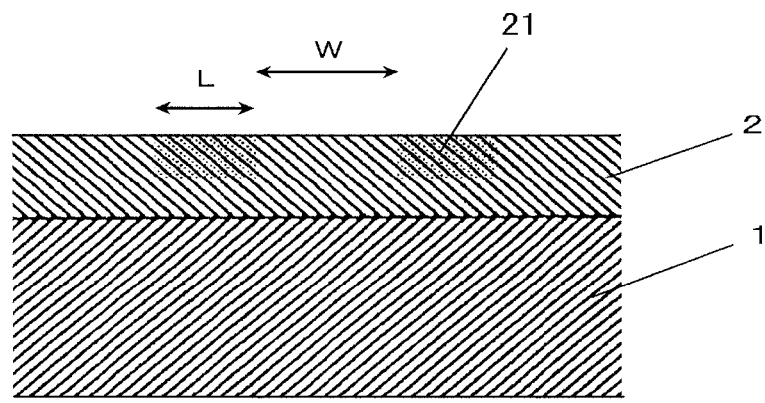
FIG. 2 illustrates a cross-section of another example of a laminate structure comprising a substrate and a magnetic layer in the magnetic recording medium manufactured according to the present invention.
Figure 3:
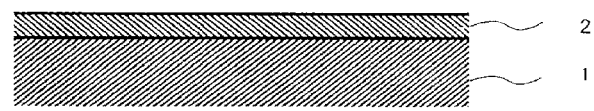
FIG. 3 is a flow-sheet of the first-half steps for producing a magnetic recording medium according to the present invention.
Figure 3:
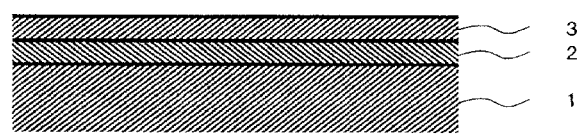
Figure 3:
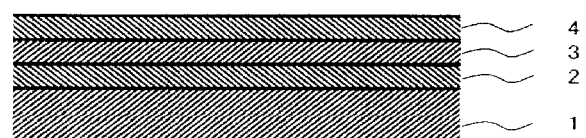
Figure 3:
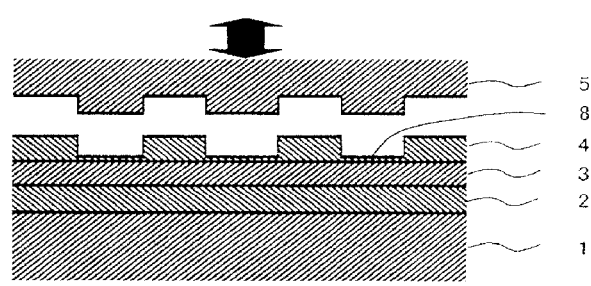
Figure 3:
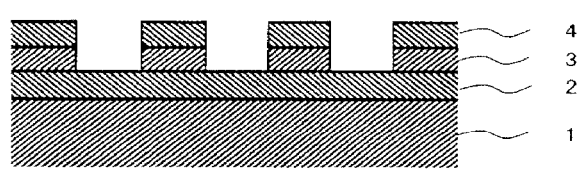
Figure 4:
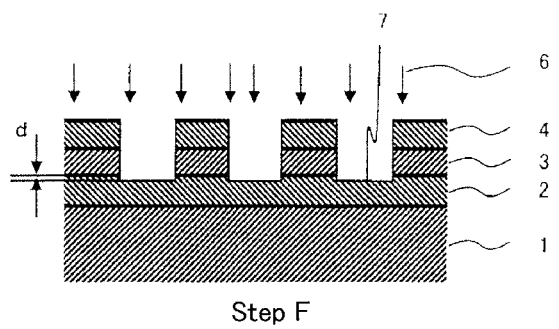
FIG. 4 is a flow-sheet of the second-half steps for producing a magnetic recording medium according to the present invention.
Figure 4:
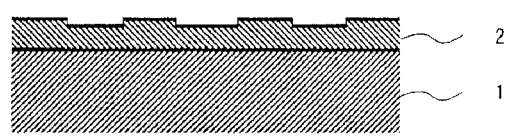
Figure 4:
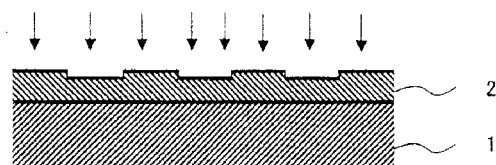
Figure 4:
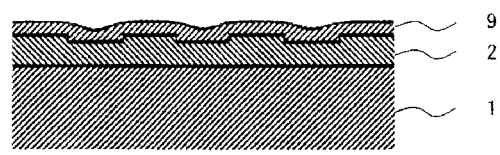

In FIGS. 1, 2, 5 and 6,
W Width of magnetic region in a magnetic recording pattern
L Width of non-magnetic region in a magnetic recording pattern
1 Non-magnetic substrate
2 Magnetic layer
21 Regions having modified magnetic properties, or non-magnetized regions
2-1 Magnetic layer having a granular structure
2-2 Magnetic layer having a non-granular structure
22, 23 Depressions In FIGS. 3 and 4,
3 Carbon mask layer
4 Resist layer
5 Stamp
6 Milling ion
7 Region from which surface layer portion of the magnetic layer have been partially removed
8 Depression in resist layer, formed by pressing
9 Protective overcoat
d Depth of the region from which surface layer portion of the magnetic layer has been partially removed, i.e., thickness of the removed surface layer portion of the magnetic layer.
In FIG. 7,
11 Medium-driving part
27 Magnetic head
28 Head driving part
29 Recording-reproducing signal system
30 Magnetic recording medium

BEST MODE FOR CARRYING OUT THE INVENTION

The present invention is concerned with a method for producing a magnetic recording medium having a magnetically partitioned magnetic recording pattern, characterized in that the magnetic partitioning is effected by the regions of the magnetic layer, which have magnetic properties modified by a reaction of the magnetic layer with ozone. More specifically, portions of the magnetic layer are reacted with ozone, whereby magnetic properties of said portions of the magnetic layer are modified (for example, magnetization of said portions is reduced), to form a magnetic recording pattern which is magnetically partitioned by said regions of the magnetic layer.

The method for producing a magnetic recording medium according to the present invention will be described specifically by referring to a discrete type magnetic recording medium.

A typical example of a magnetic recording medium have a multilayer structure comprised of a non-magnetic substrate, a soft magnetic underlayer, an intermediate layer, a magnetic layer comprised of magnetic regions having a magnetic pattern, and non-magnetic regions, and a protective overcoat, which are formed on the non-magnetic substrate in this order. On the outermost surface of the multilayer structure, a lubricant film is generally formed. The magnetic regions, i.e., regions forming recording tracks, of the magnetic layer are partitioned by the non-magnetic regions.

In an embodiment of the method according to the present invention, a magnetic recording medium having a laminate structure comprising a non-magnetic substrate and a magnetic layer as illustrated in FIG. 1 is manufactured (layers other than the non-magnetic substrate and the magnetic layer are not shown in FIG. 1).

In FIG. 1, reference numeral 1 is a non-magnetic substrate and reference numeral 2 is a magnetic layer formed on the non-magnetic substrate 1. The magnetic layer 2 has depressions 22 having a depth of "d", which have been formed by removing specific surface layer portions of the magnetic layer 2. The bottom portion of each depression 22 is formed of a region 21 having modified magnetic properties (for example, poor magnetic properties obtained by demagnetization). The magnetic recording layer 2 is partitioned by the depressions 22 and the regions 21 having a modified magnetic properties.

A method of producing a magnetic recording medium having a structure as illustrated in FIG. 1 according to the present invention will be described in reference to FIG. 3 and FIG. 4.

The method for producing a magnetic recording medium, as illustrated in FIG. 3 and FIG. 4, comprises the following seven steps (A) through (G) carried out in this order.

As illustrated in FIG. 3, in step (A), a magnetic layer 2 is formed on at least one surface of a non-magnetic substrate 1.

In step (B), a mask layer 3 comprised of, for example, carbon, is formed on the magnetic layer 2.

In step (C), a resist layer 4 is formed on the mask layer 3.

In step (D), a negative pattern of a magnetic recording pattern is formed on the resist layer 4. By the term "negative pattern" as herein used, we mean a pattern having depressions 8 in the resist layer 4 which form regions partitioning recording tracks in the magnetic recording pattern of a resulting magnetic recording medium. The negative pattern is formed by, for example, transfer printing using a stamp 5. The arrow in step (D) in FIG. 3 indicates a direction in which the stamp 5 is moved for transfer printing.

In step (E), portions of the mask layer 3 in regions corresponding to the negative pattern of the magnetic recording pattern are removed.

As illustrated in FIG. 4, in step (F), regions 7 of the magnetic layer 2, which have been exposed by the removal of the portions of the mask layer 3 in step (E), are contacted with ozone.

It is preferable that, prior to contacting said exposed regions 7 of the magnetic layer 2 with ozone in step (F), at least surface layer portions in said exposed regions 7 of the magnetic layer 2 are removed. The removal of the surface layer portions in said exposed regions 7 of the magnetic layer 2 can be effected by, exposing said regions 7 to a fluorine-containing gas.

In step (G), the residual mask layer 3, or the residual mask layer 3 and the residual resist layer 4 are removed.

After step (G) for removing the residual resist layer, or the residual resist layer and mask layer, it is preferable to conduct a step (H) of etching the surface portion of the magnetic layer by using, for example, an inert gas thereby removing slightly a surface layer portion of the magnetic layer. More specifically the surface portion of the magnetic layer is preferably etched by ion etching using an inert gas such as argon or $N_2$ to remove a surface layer portion thereof with a thickness in the range of 1 to 2 nm.

A protective overcoat 9 is preferably formed on the surface of the magnetic layer 2 as illustrated in step (I) in FIG. 4. On the outermost surface of the multilayer structure, a lubricant film (not shown in FIG. 4) is formed, if desired.

In another embodiment of the method according to the present invention, the exposed regions 7 of the magnetic layer 2 are contacted with ozone in the above-mentioned step (F) without pre-treatment of removing surface layer portions in the exposed regions 7. When the exposed regions 7 of the magnetic layer 2 are contacted with ozone, regions 21 having modified magnetic properties are formed in the surface layer of the magnetic layer 2 as illustrated in FIG. 2.

The steps in the production method of the present invention will be described specifically and more in detail.

The non-magnetic substrate 1 used in the present invention is not particularly limited, and, as specific examples thereof, there can be mentioned aluminum alloy substrates predominantly comprised of aluminum such as, for example, an Al—Mg alloy substrate; and substrates made of ordinary soda glass, aluminosilicate glass, glass ceramics, silicon, titanium, ceramics, and organic resins. Of these, aluminum alloy substrates, glass substrates such as glass ceramics substrate, and silicon substrate are preferably used.

The non-magnetic substrate preferably has an average surface roughness (Ra) of not larger than 1 nm, more preferably not larger than 0.5 nm, and especially preferably not larger than 0.1 nm.

The magnetic layer 2, formed on a surface of the above-mentioned non-magnetic substrate 1, may be either an in-plane magnetic layer or a perpendicular magnetic layer. A perpendicular magnetic layer is preferable in view of more enhanced recording density.

The magnetic layer is preferably formed from an alloy predominantly comprised of cobalt.

A preferable example of the in-plane magnetic layer is a combination of a ferromagnetic CoCrPtTa layer with a non-magnetic CrMo underlayer.

A preferable example of the perpendicular magnetic layer comprises an alloy predominantly comprised of cobalt, which includes, for example, a 70Co-15Cr-15Pt alloy and a 70Co-5Cr-15Pt-10SiO$_2$ alloy (the numeral occurring immediately before each element refers to % by mole of the element).

A preferable multilayer structure for the magnetic recording medium comprises a combination of a soft magnetic underlayer comprised of a FeCo alloy such as FeCoB, FeCoSiB, FeCoZr, FeCoZrB or FeCoZrBCu; a FeTa alloy such as FeTaN or FeTaC; or a Co alloy such as CoTaZr, CoZrNB or CoB; an orientation-control layer comprised of Pt, Pd, NiCr or NiFeCr; and optionally an intermediate ruthenium layer; and, formed thereon, the above-mentioned perpendicular ferromagnetic layer comprised of a cobalt alloy.

In the production method of the present invention, a magnetic layer having a granular structure is preferably formed as the magnetic layer because a magnetic layer having a granular structure exhibits a high reactivity with ozone. The term "magnetic layer having a granular structure" as used herein refers to a magnetic layer having a structure comprised of magnetic particles which are surrounded by an oxide. As specific examples of the oxide, there can be mentioned SiO$_2$ (as exemplified above as one ingredient of a ferromagnetic cobalt alloy), Ti oxides, W oxides, Cr oxides, Co oxides, Ta oxides and Ru oxides.

The magnetic layer usually has a thickness in the range of 3 nm to 20 nm, preferably 5 nm to 15 nm. The magnetic layer is formed so that sufficiently high input and output head powers can be obtained in consideration of the kind of magnetic alloy and the laminar structure. The magnetic layer has a thickness of at least certain value so as to obtain an output power of at least certain level at reproduction. However, parameters relating to the recordation-reproduction characteristics are generally deteriorated with an increase of the output power. Therefore an optimum thickness of magnetic layer is preferably chosen in consideration of the output power and the recordation-reproduction characteristics.

In the producing method of the present invention, a mask layer is usually formed on the surface of the magnetic layer. The mask layer is preferably comprised of carbon. When the mask layer is comprised of carbon, dry etching of the mask layer using an oxygen gas, such as reactive ion etching or reactive ion milling, using an oxygen gas can be conducted with a high efficiency, and hence, the amount of the residual mask layer in the above-mentioned step (G) is reduced and staining of a resulting magnetic recording medium is minimized.

The formation of the carbon layer can be effected by, for example, a sputtering or CVD method. A CVD method is preferably adopted because a dense carbon film is formed.

The carbon layer preferably has a thickness in the range of 5 nm to 40 nm, more preferably 10 nm to 30 nm. With a thickness of thinner than 5 nm, undesirable sagging at the edge portion of the carbon layer tends to occur and the formability of a magnetic recording pattern is deteriorated. Further, ions tend to penetrate through the resist layer and the carbon mask layer into the magnetic layer, thereby deteriorating the magnetic characteristics of the magnetic layer. In contrast, with a thickness of thicker than 40 nm, the time required for etching the carbon mask layer becomes long and thus the productivity becomes poor. Further, when the carbon mask layer is etched, a residue undesirably remains on the magnetic layer.

In the producing method of the present invention, a resist layer is formed on the carbon mask layer and then a negative pattern of the magnetic recording pattern is formed on the resist layer. The formation of a negative pattern of the magnetic recording pattern on the resist layer can be carried out by the conventional photolithographic technique. However, it is preferable from an operation efficiency to adopt a method of pressing a stamp against the resist layer whereby a negative pattern of a magnetic recording pattern is transferred to the resist layer.

In the production method of the present invention, after a negative pattern of the magnetic recording pattern is formed on the resist layer 4 in step (D) shown in FIG. 3, the depressed regions 8 of resist layer 4 preferably have a thickness in the range of 0 to 20 nm. When the depressed regions 8 of resist layer have such thickness, the selective removal of the resist layer and the carbon layer in step (E) in FIG. 3 and step (F) in FIG. 4 can be effected in an advantageous manner. That is, undesirable sagging at edge portions of the carbon mask layer 3 can be avoided and the shieldability of the carbon mask layer 3 against milling ion 6 can be enhanced in step (F) in FIG. 4, and the formability of the magnetic recording pattern by the carbon mask layer 3 also is enhanced.

In a preferred embodiment of the method for producing a magnetic recording medium according to the present invention, a material which can be cured upon irradiation with radiation is used as the material for forming the resist layer 4 in step (C) in FIG. 3; and, when a negative magnetic recording pattern is transferred onto the resist layer 4 by using a stamp 5 in step (D), or after the transfer of negative magnetic recording pattern has been completed, the resist layer 4 is irradiated with radiation. In this preferred embodiment, the configuration of stamp 5 can be transferred on the resist layer 4 with high precision. Consequently, when the regions of the carbon mask layer 3, corresponding to the negative magnetic recording pattern of the magnetic recording pattern, are removed by etching in step (E) in FIG. 3, undesirable sagging at edge portions of the carbon layer 3 can be avoided and the shieldability of the carbon mask layer 3 against milling ion 6 can be enhanced, and the formability of the magnetic recording pattern by the carbon mask layer 3 can also be enhanced.

The radiation used for curing the curable material refers to electromagnetic waves in a broad sense which include heat rays, visible light, ultraviolet light, X rays and gamma rays. As specific examples of the curable material, there can be mentioned thermosetting resins which are curable by heat rays, and ultraviolet-setting resins which are curable by ultraviolet light.

In the method for producing a magnetic recording medium according to the present invention, in the step (D) of transferring a negative magnetic recording pattern onto the resist layer 4 by using a stamp 5, it is preferable that the stamp 5 is pressed on the resist layer 4 having high fluidity, and, while the resist layer is in a pressed state, the resist layer 4 is irradiated with radiation to be thereby cured, and thereafter the stamp 5 is removed from the resist layer 4. By this procedure, the configuration of the stamp can be transferred to the resist layer 4 with a high precision.

For irradiating the resist layer having high fluidity with radiation while the resist layer is in a pressed state, there can be adopted a method of irradiating a laminate structure comprising the resist layer with radiation by exposing the substrate side (i.e., side opposite to the stamp-pressed resist layer) of the laminate structure to the radiation; a method of using a radiation-transmitting stamp, and exposing the stamp-pressed side of the laminated structure to radiation; a method of exposing the stamp-pressed resist layer to radiation by applying radiation from side of the laminate structure; and a method of exposing the stamp-pressed side of the laminate structure or the opposite side (substrate side) thereof, with radiation exhibiting a high conductivity to a solid, such as heat rays.

In a preferred specific example of the procedure of irradiating the radiation-curable resist layer with radiation to cure the resist layer, an ultraviolet ray-curable resin such as novolak resin, an acrylic acid ester resin or a cycloaliphatic epoxy resin is used as the radiation-curable resist resin, and a stamp made of a highly ultraviolet ray-transmitting glass or resin is used.

Preferably a $SiO_2$ material or $SiO_2$-containing material is used for the resist layer. A $SiO_2$ material or $SiO_2$-containing material exhibits a high resistance to dry-etching using an oxygen gas, and therefore, when a negative pattern of a magnetic recording pattern is formed on the carbon mask layer by ion milling, undesirable blurring of a negative pattern image can be avoided. In other words, the carbon mask layer can be subjected to dry etching using an oxygen gas without difficulty and with high efficiency. Since the $SiO_2$ material or $SiO_2$-containing material exhibits a high resistance to dry-etching using an oxygen gas, when a negative pattern of a magnetic recording pattern is formed on the carbon mask layer by dry etching, a sharp image of the negative pattern with sheer side walls in the edges of the negative pattern image of the carbon mask layer can be formed. Thus a sharp magnetic recording pattern is given to the magnetic layer, and a magnetic recording medium having improved fringe characteristics can be obtained.

After the negative pattern of the magnetic recording pattern is given to the resist layer 4 in step (D) shown in FIG. 3, in the case when the depressed regions 8 of resist layer 4 remains, the depressed regions of resist layer are removed and further the corresponding regions of the carbon mask layer are removed in step (E). The removal of the depressed regions of resist layer and the corresponding regions of carbon mask layer is effected by dry etching such as reactive ion etching or reactive ion milling.

In the production method of the present invention, regions of the magnetic layer, which are not covered with the carbon mask layer and the resist layer, are contacted with ozone whereby said regions of the magnetic layer are reacted with ozone. More specifically said regions having been exposed by the removal of the portions of the mask layer in step (E) are contacted with gaseous ozone under vacuum, or an ozone-containing solution such as aqueous solution of gaseous ozone whereby said regions of the magnetic layer are reacted with ozone.

Prior to contacting the exposed regions of the magnetic layer with ozone in step (F), it is preferable to remove surface layer portions in said exposed regions of the magnetic layer to a depth in the range of 0.1 nm to 15 nm (the depth is indicated by "d" in step (F) in FIG. 4). This is because surface layer portions in the exposed regions of the magnetic layer have been often modified by the influence of the masking carbon layer or air, and the modified surface layer portions tend to interfere the reaction of the magnetic layer with ozone.

The removal of the surface layer portions of the magnetic layer is effected by, for example, dry-etching (more specifically, ion-milling or reactive ion etching) the surface layer portions of the carbon mask layer, and thereafter, dry-etching the surface layer portions of the magnetic layer. By adopting the above-mentioned procedures, a sharp image of the negative pattern with sheer side walls in the edges of the negative pattern image of the carbon mask layer can be formed. This leads to the formation of a sharp pattern with sheer side walls in the edges of the magnetic layer.

The above-mentioned procedures result in a magnetic recording medium having improved fringe characteristics.

The above-mentioned removal of the residual carbon layer is preferably carried out by a reactive ion etching method using an oxygen gas. The above-mentioned removal of the surface layer portions of the magnetic layer is preferably carried out by dry etching, for example, ion milling while an inert gas such as argon gas or $N_2$ gas is introduced. Thus the ion milling of the carbon layer and the ion milling of the surface layer portions of the magnetic layer should preferably be carried out by an optimum procedure and under optimum conditions.

In a preferred embodiment of the production method of the present invention, prior to contacting the exposed regions of the magnetic layer, which are not covered with the carbon mask layer and the resist layer, with ozone, the following procedure (i) or procedures (ii) are preferably carried out: (i) a procedure of exposing said exposed regions of the magnetic layer to a fluorine-containing gas, or (ii) procedures of removing surface layer portions in said exposed regions of the magnetic layer as mentioned above, and then, exposing said exposed regions of the magnetic layer to a fluorine-containing gas. By this treatment of the surface of the exposed regions of the magnetic layer, the reactivity with ozone of the magnetic layer in the exposed regions can be enhanced and the reaction of the magnetic layer in the exposed regions with ozone can be effected with more enhanced efficiency.

In the production method of the present invention, regions of the magnetic layer, which are not covered with the carbon mask layer and the resist layer, are contacted with ozone, more specifically gaseous ozone or an ozone-containing solution whereby said regions of the magnetic layer are reacted with ozone. As the ozone-containing solution, a solution of ozone in pure water is preferably used. By the contact of the magnetic layer with ozone, the magnetic properties of said treated regions of the magnetic layer are modified, and hence, a magnetic recording pattern having been partitioned by the ozone-treated regions is formed on the magnetic layer. Ozone has a high activity for oxidation, and hence, it is believed that said exposed regions of the magnetic layer are oxidized by ozone whereby the magnetic properties of the treated regions of the magnetic layer are modified. This modification of the magnetic properties by ozone can be effected with a high efficiency as compared with the conventional ion implantation or laser irradiation procedure. This is because the contact treatment with ozone can be effected over a broad area of the laminate structure with high reactivity and high efficiency and therefore the production time can be shortened.

The exposure of the magnetic layer to ozone is preferably carried out under a reaction pressure in the range of 0.1 Pa to 5 Pa for a reaction time in the range of 5 seconds to 60 seconds. The substrate and the magnetic layer are maintained preferably at a temperature in the range of 25° C. to 300° C. for the reaction.

In the case when ozone is used as an aqueous solution in pure water, the concentration of ozone is preferably in the range of 0.01 to 10 ppm, more preferably 0.1 to 10 ppm. At an ozone concentration of less than 0.01 ppm, the desired effect is difficult to obtain. In contrast, at an ozone concentration exceeding 10 ppm, a problem such as corrosion of piping often arises.

The magnetic layer to be exposed to gaseous ozone or an aqueous ozone solution in pure water in the production method of the present invention preferably has a granular structure. By the term "granular structure" as used herein, we mean a structure comprised of magnetic particles which are surrounded by an oxide. In the magnetic layer having a granular structure, magnetic crystal particles are separated by non-magnetic phases, and hence, magnetic interaction among the particles is weak and the resulting magnetic layer is characterized as exhibiting a very low noise. When the magnetic layer having a granular structure is exposed to gaseous ozone or an aqueous ozone solution in pure water, oxide layers surrounding magnetic particles at grain boundaries are easily selectively etched by, for example, a reactive ion etching apparatus using a fluorine-containing gas, and consequently the oxidation reaction of a magnetic metal such as cobalt in the magnetic layer with ozone can be accelerated and the modification of the magnetic properties in the regions partitioning a magnetic recording pattern can be effected with a more enhanced efficiency.

In another preferred embodiment of the method for producing a magnetic recording medium according to the present invention, a magnetic layer with a two-layer structure is formed which comprises a magnetic layer having a granular structure and a magnetic layer having a non-granular structure.

The method of the present invention drawn to this preferred embodiment is characterized by comprising the following nine steps (A1) through (G1) carried out in this order.

(A1) a step of forming, on at least one surface of a non-magnetic substrate, a magnetic layer having a granular structure, (A2) a step of forming a magnetic layer having a non-granular structure on the magnetic layer having a granular structure, (B1) a step of forming a mask layer on the magnetic layer having a non-granular structure, (C1) a step of forming a resist layer on the mask layer, (D1) a step of forming a negative pattern of the magnetic recording pattern on the resist layer, (E1) a step of removing portions of the mask layer in regions corresponding to the negative pattern of the magnetic recording pattern, (E2) a step of removing portions of the magnetic layer having a non-granular structure in regions corresponding to the negative pattern of the magnetic recording pattern, (F1) a step of contacting regions of the magnetic layer having the granular structure, which have been exposed by the removal of portions of the magnetic layer having a non-granular structure in step (E2), with ozone whereby the magnetic layer having the granular structure is reacted with ozone to modify the magnetic properties in said regions of the magnetic layer having the granular structure, and (G1) a step of removing the residual mask layer, or the residual mask layer and resist layer.

Figure 5:
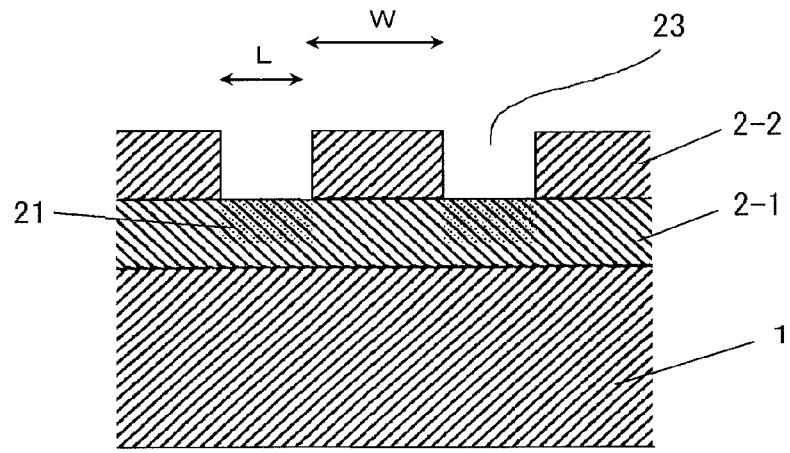
FIG. 5 illustrates a cross-section of still another example of a laminate structure comprised of a substrate and a magnetic layer in the magnetic recording medium manufactured according to the present invention.
Figure 6:
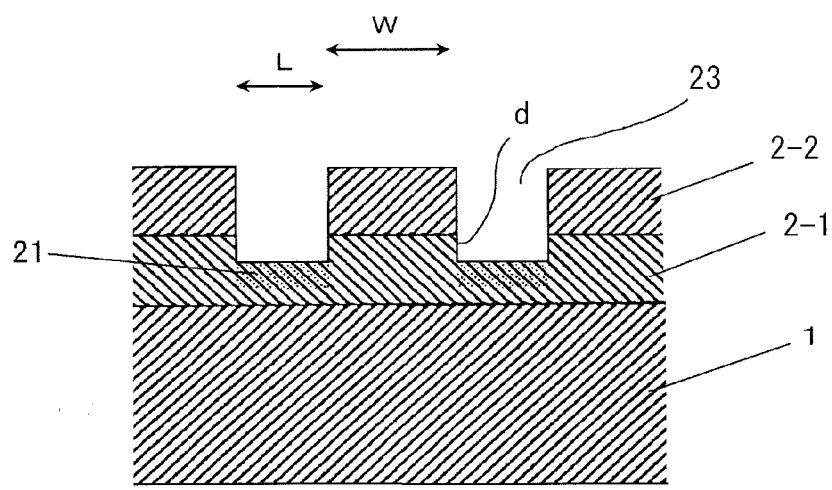
FIG. 6 illustrates a cross-section of a further example of a laminate structure comprised of a substrate and a magnetic layer in the magnetic recording medium manufactured according to the present invention.
Figure 7:
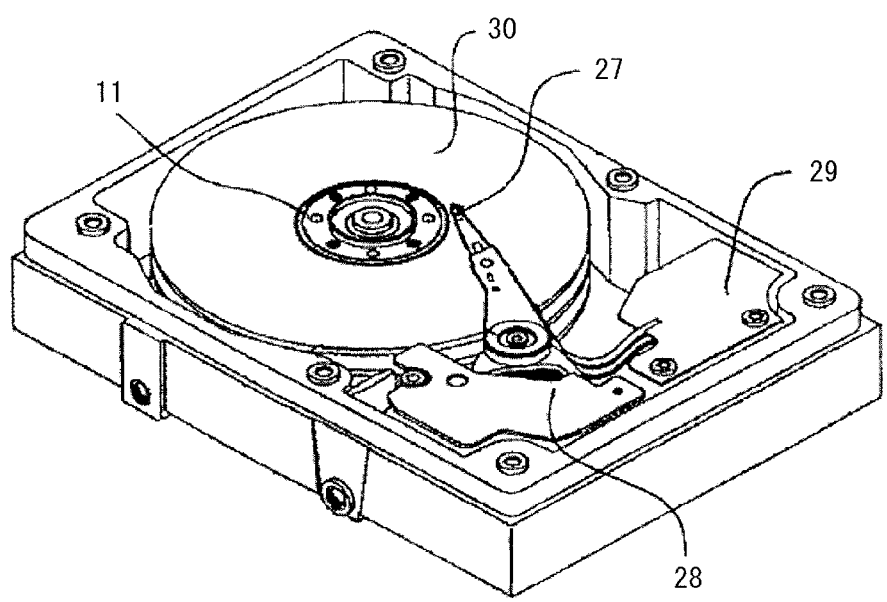
FIG. 7 is a schematic illustration of the magnetic recording-reproducing apparatus according to the present invention.

Examples of a structure comprised of a substrate and a two-layer magnetic layer in the magnetic recording medium manufactured according to the above-mentioned preferred embodiment of the present invention are illustrated in FIG. 5 and FIG. 6.

In FIG. 5, the structure illustrated comprises a non-magnetic substrate 1, a magnetic layer having a granular structure 2-1 formed on the substrate 1, and a magnetic layer having a non-granular structure 2-2 formed on the magnetic layer 2-1. The method for producing a magnetic recording medium having the structure illustrated in FIG. 5 is characterized as comprising, after step (E1) of removing portions of the mask layer in regions corresponding to the negative pattern of a magnetic recording pattern, and after step (E2) of removing portions 22 of the magnetic layer having a non-granular structure in regions corresponding to the negative pattern of the magnetic recording pattern, a step (F1) is carried out wherein regions of the magnetic layer having the granular structure, which have been exposed by the removal of portions of the magnetic layer having a non-granular structure in step (E2), are contacted with ozone, i.e., gaseous ozone or an aqueous solution of ozone in pure water. By carrying out the step (F1) in the production method, the magnetic properties in said regions corresponding to the negative pattern of the magnetic recording pattern in the magnetic layer can be modified with a high efficiency.

The magnetic layer having a granular structure preferably has a thickness in the range of 5 to 10 nm, and the magnetic layer having a non-granular structure preferably has a thickness in the range of 2 to 7 nm.

In FIG. 5 in which a modified structure is illustrated. The modified structure is manufactured by carrying out step (E2) of removing portions 22 of the magnetic layer having a non-granular structure 2-2 in regions corresponding to the negative pattern of the magnetic recording pattern, an additional step of removing a surface layer portion of the magnetic layer having a granular structure 2-1, and then step (F1) of contacting with ozone the regions of the magnetic layer having the granular structure 2-1, which have been exposed by the removal of portions of the magnetic layer having a non-granular structure in step (E2). The depressions formed by the additional step of removing a surface layer portion of the magnetic layer having a granular structure 2-1 has a depth of "d" which is preferably in the range of 0.1 to 15 nm.

The procedures and conditions adopted in the method of producing a magnetic recording medium having the structure illustrated in FIG. 5 or FIG. 6 are substantially the same as those adopted in the method of producing a magnetic recording medium having the structure illustrated in FIG. 1 or FIG. 2, except for the specific procedures adopted in the above-mentioned method comprising the steps (A1) through (G1).

The depressions having a depth "d" (reference numeral 22 in FIG. 1 and reference numeral 23 in FIG. 5 and FIG. 6) in the magnetic recording layer may be filled with a non-magnetic material to form a flat-topped surface of the magnetic layer. A preferable example of the non-magnetic material is an SOG (spin-on-glass) of a $SiO_2$-forming material in view of ease in handling and simplicity of working.

Alternatively, when the depressions in the magnetic recording layer have a very small depth, i.e., a depth "d" of not larger than 15 nm, the depressions may not be filled with a non-magnetic material. Even though such depressions are not filled with a non-magnetic material, a magnetic recording medium exhibiting good floatability of a magnetic head (i.e., the head is not crushed upon recording/reproducing) can be obtained by the uppermost surface of the magnetic recording medium is coated directly with a carbon protective film.

To produce a magnetic recording medium exhibiting a high recording density by the method of the present invention, a magnetic layer having a magnetic pattern comprised of magnetic portions with a width "W" and non-magnetic portions with a width "L" as illustrated in FIGS. 1, 2, 5 and 6 is formed preferably so that W and L are not larger than 200 nm and not larger than 100 nm, respectively, and thus, the track pitch (i.e., the sum of W plus L) is preferably not larger than 300 nm, in view of high recording density. The smaller the track pitch, the higher the recording density.

The magnetically partitioned magnetic recording pattern in the magnetic recording medium produced by the method of the present invention can include a pattern of a type wherein an upper part of each magnetic portion is partitioned by the adjacent non-magnetic portions, but, a lower part of each magnetic portion is not partitioned by non-magnetic portions, i.e., a lower part of the magnetic portion is contiguous to the adjacent lower parts of the magnetic portions. This partially partitioned magnetic recording pattern should be construed to be included in the magnetically partitioned magnetic recording pattern in the magnetic recording medium as produced by the present invention.

By the term "magnetic recording patterns" as used in this specification is meant a magnetic recording pattern in a broad sense which include patterned media wherein a magnetic recording pattern are arranged with a certain regularity per bit; media wherein magnetic recording patterns are arranged in tracks fashion; and servo signal patterns.

The method of the present invention is preferably adopted for the manufacture of a discrete type magnetic recoding medium in view of simplicity and ease, wherein the magnetically partitioned magnetic recording patterns involve magnetic recoding tracks and servo signal patterns.

In the production method of the present invention, after the step (F) of contacting with ozone the regions of the magnetic layer, which have been exposed by the removal of the portions of the mask layer in step (E), the step (G) of removing the residual mask layer, or the residual mask layer and resist layer is adopted. The removal of the residual resist layer and the residual mask layer is carried out preferably by dry etching, reactive ion etching or ion milling.

In a preferred embodiment of the method of the present invention, after the step (G), the magnetic layer is preferably exposed to an inert gas such as argon gas in step (H) as illustrated in FIG. 3 whereby the outermost surface portion of the magnetic layer, which have been exposed to ozone, are etched so that a surface layer portion with a thickness of 1 to 2 nm is removed. Thus the surface of the magnetic layer in the regions exposed to ozone is rendered smooth.

The uppermost surface of the magnetic layer, from which the residual resist layer and the residual carbon mask layer have been removed, and the depressed portions of which have been filled or have not been filled with a non-magnetic material, is usually coated with a protective carbon overcoat 9 as illustrated in step I in FIG. 4.

The overcoat 9 can be formed from a material conventionally used for the general overcoats, which includes, for example, carbonaceous materials such as carbon (C), hydrogenated carbon ($H_xC$), nitrided carbon (CN), amorphous carbon and silicon carbide (SiC); and other conventionally used materials such as $SiO_2$, $Zr_2O_3$ and TiN. Two or more overcoats may be formed.

The thickness of the overcoat 9 is preferably not larger than 10 nm. If the thickness of the protective overcoat is larger than 10 nm, the distance between the head and the magnetic layer becomes undesirably large and the input and output powers are often insufficient.

The formation of the overcoat is usually carried out by a sputter method or a CVD method.

A lubricating layer (not shown in FIG. 4) is preferably formed on the overcoat. The lubricating layer is formed from, for example, a fluorine-containing lubricant, a hydrocarbon lubricant or a mixture thereof. The thickness of the lubricating layer is usually in the range of 1 to 4 nm.

The constitution of an example of the magnetic recording-reproducing apparatus according to the present invention is illustrated in FIG. 7. The magnetic recording-reproducing apparatus of the present invention comprises, in combination, the above-mentioned magnetic recording medium 30 of the present invention; a driving part 11 for driving the magnetic recording medium in the recording direction; a magnetic head 27 comprising a recording part and a reproducing part; head-driving part 28 for moving the magnetic head 27 in a relative motion to the magnetic recording medium 30; and a recording-and-reproducing signal treating means 29 for inputting signal into the magnetic head 27 and for reproduction of output signal from the magnetic head 27.

The magnetic recording-reproducing apparatus comprising the combination of the above-mentioned means can provide a high recording density. More specifically, in the magnetic recording medium of the magnetic recording-reproducing apparatus, the magnetic recording tracks are magnetically discrete, and therefore, the recording head width and the reproducing head width can be approximately the same size as each other with the result of sufficiently high reproducing output power and high SNR. This is in a striking contrast to the conventional magnetic recording medium wherein the reproducing head width must be smaller than the recording head width to minimize the influence of the magnetization transition regions in the track edges.

By constituting the reproducing part of the magnetic head as GMR head or TMR head, a sufficiently high signal intensity can be obtained even at a high recording density, that is, the magnetic recording apparatus having a high recording density can be provided.

When the head is floated at a floating height in the range of 0.005 μm to 0.020 μm, which is lower than the conventionally adopted floating height, the output power is increased and the SNR becomes large, and thus the magnetic recording apparatus can have a large size and a high reliability.

If a signal treating circuit using a sum-product composite algorithm is combined in the magnetic recording medium, the recording density can be much more enhanced, and a sufficiently high SNR can be obtained even when recordation-reproduction is carried out at a track density of 100 k-tracks or more per inch, or a linear recording density of 1,000 k-bit or more per inch, or a high recording density of at least 100 G-bit or more per square inch.

EXAMPLES

The invention will now be specifically described by the following experiments for evaluating the change of magnetization occurring due to treatment with ozone, and the following examples of the invention.

Experiments 1 to 22, Comparative Experiments 1 to 7

A glass substrate for HD was placed in a vacuum chamber and the chamber was vacuumed to a pressure of not higher than $1.0 \times 10^{-5}$ Pa to remove the air. The glass substrate used was comprised of glass ceramics having a composition of $Li_2Si_2O_5$, $Al_2O_3$—$K_2O$, $Al_2O_3$—$K_2O$, MgO—$P_2O_5$ and $Sb_2O_3$—ZuO, and has an outer diameter of 65 mm and an inner diameter of 20 mm, and an average surface roughness (Ra) of 2 angstroms.

On the glass substrate, a soft magnetic underlayer composed of 60Fe30Co10B, an intermediate layer composed of Ru and a magnetic layer having a granular structure composed of 70Co-5Cr-15Pt-10SiO$_2$ alloy (the numerals immediately before the elements indicate percents by mole of the elements) were formed in this order by DC sputtering.

The respective layers had the following thicknesses. 60Fe30Co10B soft magnetic underlayer: 60 nm, Ru intermediate layer: 10 nm, and magnetic layer: 15 nm.

Then each multilayer structure was treated as follows.

In Experiments 1-8 and 12-19, and Comparative Experiments 1, 2 and 4-6, each multilayer structure was treated by ICP to remove a surface portion with a thickness of about 3 nm of the magnetic layer. The ICP treatment was carried out under the following conditions. CF$_4$ gas: 10 sccm, pressure: 0.1 Pa, acceleration voltage: 300 V, input power: 200 W, bias voltage for substrate: 20 W, and etching time: 45 seconds.

In Experiments 9-11 and 20-22, and Comparative Experiments 3 and 7, the ICP treatment of each multilayer structure was not carried out.

In Comparative Experiments 3 and 7, each multilayer structure was exposed to argon gas.

Thereafter, each multilayer structure was treated with ozone as follows.

Each multilayer structure was exposed to ozone gas in Experiments 1-11, and spin-rinsed with aqueous ozone in Experiments 12-22. The exposure to ozone gas was carried out under a pressure of $5 \times 10^{-5}$ Pa in a vacuum chamber. The spin-rinse with aqueous ozone was carried out as follows. Pure water having ozone dissolved therein was showered at a flow rate of 1 liter/min onto the substrate, and thereafter, the substrate was rotated to remove water giving a dried substrate. In Experiments 12-16 and 19-22, the aqueous ozone was showered while ultrasonic wave was imposed to the aqueous ozone at 950 kHz and 500 W using an ultrasonic cleaning apparatus available from KAIJO Corporation.

For comparison, the ozone-exposure treatment was not carried out in Experiments 4-7.

The treating conditions and the change in the amount of magnetization as determined by the measurements before and after the treatment are shown in Tables 1 and 2.

TABLE 1

| Experiment No. | Flow rate of ozone gas (sccm) | Pressure (Pa) | Heating temp. of substrate (° C.) | Irradiation time *1 (sec) | Amount of magnetization (memu/cm$^2$) Before *2 | Amount of magnetization (memu/cm$^2$) After *3 | % of reduction in magnetization |
|---|---|---|---|---|---|---|---|
| Exp. 1 | 50 | 1 | 150 | 30 | 0.32 | 0.05 | 84% |
| Exp. 2 | 100 | 1 | 150 | 30 | 0.31 | 0.04 | 87% |
| Exp. 3 | 150 | 1 | 150 | 30 | 0.33 | 0.04 | 88% |
| Exp. 4 | 50 | 5 | 150 | 30 | 0.33 | 0.01 | 97% |
| Exp. 5 | 50 | 0.5 | 150 | 30 | 0.31 | 0.12 | 61% |
| Exp. 6 | 50 | 1 | 150 | 10 | 0.33 | 0.13 | 61% |
| Exp. 7 | 50 | 1 | 150 | 60 | 0.32 | 0.01 | 97% |
| Exp. 8 | 50 | 1 | 25 | 30 | 0.32 | 0.13 | 59% |
| Exp. 9 | 50 | 1 | 150 | 30 | 0.33 | 0.14 | 58% |
| Exp. 10 | 150 | 1 | 150 | 30 | 0.32 | 0.13 | 59% |
| Exp. 11 | 150 | 1 | 150 | 60 | 0.32 | 0.1 | 69% |
| Com. Exp. 1 | 0 | 1 | 150 | 60(Ar) | 0.32 | 0.26 | 19% |
| Com. Exp. 2 | 0 | 5 | 150 | 30(Ar) | 0.31 | 0.21 | 32% |
| Com. Exp. 3 | 0 | 1 | 150 | 30(Ar) | 0.33 | 0.33 | 0% |

Note
*1 Irradiation time with ozone gas in Experiments 1-11
Irradiation time with argon gas in Comparative Experiments 1-3
*2 Amount of magnetization as measured before irradiartion with ozone gas in Experiments 1-11 and with argon gas in Comparative Experiments 1-3
*3 Amount of magnetization as measured after irradiartion with ozone gas in Experiments 1-11 and with argon gas in Comparative Experiments 1-3

TABLE 2

| Experiment No. | Amount of ozone in aq. ozone (ppm) | Usshower | Spin-rinse time (sec) | Amount of magnetization (memu/cm$^2$) Before *1 | Amount of magnetization (memu/cm$^2$) After *2 | % of reduction in magnetization |
|---|---|---|---|---|---|---|
| Exp. 12 | 0.05 | yes | 60 | 0.33 | 0.05 | 85% |
| Exp. 13 | 0.1 | yes | 60 | 0.34 | 0.03 | 91% |
| Exp. 14 | 0.5 | yes | 60 | 0.3 | 0.02 | 93% |
| Exp. 15 | 1 | yes | 60 | 0.31 | 0.01 | 97% |
| Exp. 16 | 10 | yes | 60 | 0.34 | 0.01 | 97% |
| Exp. 17 | 1 | no | 60 | 0.35 | 0.1 | 71% |
| Exp. 18 | 10 | no | 60 | 0.32 | 0.07 | 78% |
| Exp. 19 | 1 | yes | 30 | 0.29 | 0.03 | 90% |
| Exp. 20 | 1 | yes | 60 | 0.33 | 0.15 | 55% |
| Exp. 21 | 5 | yes | 60 | 0.35 | 0.14 | 60% |
| Exp. 22 | 10 | yes | 60 | 0.31 | 0.11 | 65% |
| Com. Exp. 4 | — | — | — | 0.35 | 0.24 | 31% |
| Com. Exp. 5 | — | — | — | 0.34 | 0.21 | 38% |
| Com. Exp. 6 | — | — | — | 0.31 | 0.28 | 10% |
| Com. Exp. 7 | — | — | — | 0.33 | 0.32 | 3% |

Note
*1 Amount of magnetization as measured before spin-rinse with aqueous ozone in Experiments 12-22
*2 Amount of magnetization as measured after spin-rinse with aqueous ozone in Experiments 12-22

Example 1

A glass substrate for HD was placed in a vacuum chamber and the chamber was vacuumed to a pressure of not higher than $1.0 \times 10^{-5}$ Pa to remove the air. The glass substrate used was comprised of glass ceramics having a composition of $Li_2Si_2O_5$, $Al_2O_3$—$K_2O$, $Al_2O_3$—$K_2O$, MgO—$P_2O_5$ and $Sb_2O_3$—ZuO, and has an outer diameter of 65 mm and an inner diameter of 20 mm, and an average surface roughness (Ra) of 2 angstroms.

On the glass substrate, a soft magnetic underlayer composed of 60Fe30Co10B, an intermediate layer composed of Ru and a magnetic layer having a granular structure composed of 70Co-5Cr-15Pt-10SiO$_2$ alloy were formed in this order by DC sputtering. A carbon mask layer was formed on the magnetic layer by a P-CVD method.

The respective layers had the following thicknesses. 60Fe30Co10B soft magnetic underlayer: 60 nm, Ru intermediate layer: 10 nm, magnetic layer: 15 nm, and carbon mask layer: 30 nm.

Then a SiO$_2$ resist layer with a thickness of 100 nm was formed on the carbon mask layer by spin-coating.

A glass stamp having a negative pattern corresponding to the desired magnetic recording pattern was pressed onto the resist layer at a pressure of 1 MPa (about 8.8 kgf/cm$^2$). Thereafter the stamp was separated from the resist layer thereby transferring a magnetic recording pattern on the resist layer. The thus-transferred magnetic recording pattern had a configuration such that the elevations in the resist layer are circular with a width of 120 nm, and the depressions in the resist layer are circular with a width of 60 nm. The thickness of the patterned resist layer was 80 nm and the thickness of the depressed portions of the resist layer was about 5 nm. The depressed portions had an angle of about 90 degrees to the substrate surface.

The depressed portions of the resist layer were removed by etching using CF$_4$ under the following conditions. Pressure: 0.5 Pa, flow rate: 40 sccm, plasma power: 200 W, bias voltage: 20 W, and etching time: 10 seconds.

Thereafter, the portions of the carbon mask layer corresponding to the removed depressed portions of the resist layer were removed by dry etching. The dry etching conditions for etching the carbon mask layer were as follows. O$_2$ gas: 40 sccm, pressure: 0.3 Pa, high-frequency plasma power: 300 W, DC bias: 30 W, and etching time: 30 seconds.

Then a surface layer portion of each of the corresponding portions of the magnetic layer was removed by ion etching. The ion etching conditions for etching the surface layer portion of magnetic layer were: N$_2$ gas: 10 sccm, pressure: 0.1 Pa, acceleration voltage: 300 V, and etching time: 5 seconds. The depressed regions, formed by ion etching, of the magnetic layer had a depth ("d" in FIG. 1) of about 1 nm.

Thereafter the exposed regions of the magnetic layer (which are not covered with the remaining portions of the carbon mask layer) were exposed to ozone gas. The exposure to ozone gas was carried out by flowing ozone gas in a chamber at a flow rate of 40 sccm, a pressure of 1 Pa for 10 seconds and at a substrate temperature of 150° C.

Then residual portions of the resist layer and residual portions of the carbon layer, which remained on the surface of the laminate structure, were removed by dry etching. Thereafter the exposed surface of the magnetic layer was subjected to ion milling to remove a surface layer having a thickness of about 1 nm to about 2 nm. The ion milling conditions were as follows. Ar gas: 10 sccm, pressure: 0.5 Pa, and time: 5 seconds. Thereafter a protective carbon overcoat with a thickness of 5 nm was formed by a CVD method, and finally the laminate structure was coated with a fluorine-containing lubricant to form a lubricating film with a thickness of 2 nm. Thus, the manufacture of a magnetic recording medium was completed.

The electromagnetic conversion characteristics of the magnetic recording medium were evaluated by using a spin stand. A vertical recording head and a TuMR reading head were used for the evaluation. The electromagnetic conversion characteristics were determined by measuring 3T-squash at recording a signal of 750 kFCl. The 3T-squash was 90%, and thus the electromagnetic conversion characteristics were excellent.

Example 2

By the same procedures as described in Example 1, a magnetic recording medium was produced wherein a magnetic layer having a granular structure comprised of Co10Cr20Pt8 (SiO$_2$) with a thickness of 10 nm was formed and thereon a magnetic layer having a non-granular structure comprised of Co14Cr14Pt4B with a thickness of 5 nm was formed. Surface layer portions of the magnetic layer having a granular structure were removed to a depth of 5.5 nm. All other conditions and procedures remained the same as in Example 1. The electromagnetic conversion characteristics of the magnetic recording medium were evaluated by the same procedures as in Example 1. The 3T-squash was 92%.

INDUSTRIAL APPLICABILITY

The magnetic recording medium produced by the method of the present invention wherein a magnetic layer is formed on a non-magnetic substrate and then a magnetic recording pattern is formed on the magnetic layer, is characterized in that good and stable head-floatability is ensured, and the magnetic recording pattern is partitioned by the regions exhibiting excellent partitionability and the signal interferes occurring between the adjacent partitioned regions in the pattern are suppressed, and that a high recording density can be achieved.

In view of the above-mentioned beneficial characteristics, the magnetic recording medium produced by the method of the present invention is useful especially as a discrete type magnetic recording medium having a magnetically partitioned recording pattern comprising magnetic recording tracks and a servo signal pattern. The method of producing the magnetic recording medium is simple and easy.

The invention claimed is:

1. A method for producing a magnetic recording medium having a magnetically partitioned magnetic recording pattern on at least one surface of a nonmagnetic substrate, characterized by comprising the following nine steps (A1) through (G1) carried out in this order:
    (A1) a step of forming, on at least one surface of a non-magnetic substrate, a magnetic layer having a granular structure comprised of magnetic particles surrounded by an oxide,
    (A2) a step of forming a magnetic layer having a non-granular structure on the magnetic layer having a granular structure,
    (B1) a step of forming a mask layer on the magnetic layer having a non-granular structure,
    (C1) a step of forming a resist layer on the mask layer,
    (D1) a step of forming a negative pattern of the magnetic recording pattern on the resist layer,
    (E1) a step of removing regions of the mask layer corresponding to the negative pattern of the magnetic recording pattern,
    (E2) a step of removing regions of the magnetic layer having a non-granular structure corresponding to the negative pattern of the magnetic recording pattern,
    (E3) a step of removing surface layer portions having a thickness in the range of 0.1 nm to 15 nm in the exposed regions of the magnetic layer having the granular structure which have been exposed by the step (E2), (F1) a step of contacting the exposed regions of the magnetic layer having the granular structure, which have been exposed by the removal of the surface layer portions of the magnetic layer in step (E3), with ozone whereby the magnetic layer having the granular structure is reacted with ozone to modify the magnetic properties in the exposed regions of the magnetic layer having the granular structure, and (G1) a step of removing the residual mask layer, or the residual mask layer and resist layer.

2. A method for producing a magnetic recording medium according to claim 1, wherein, after step (E3) of removing surface layer portions in the exposed regions of the magnetic layer having the granular structure, but, prior to contacting said exposed regions of the magnetic layer having the granular structure with ozone in step (F1), said exposed regions of the magnetic layer having the granular structure are exposed to a fluorine-containing gas.

3. A method for producing a magnetic recording medium according to claim 1, wherein the reaction of the exposed regions of the magnetic layer with ozone is effected by contacting said exposed regions of the magnetic layer with ozone gas or a liquid containing ozone gas.

4. A method for producing a magnetic recording medium according to claim 1, wherein the mask layer is formed from carbon.

5. A method for producing a magnetic recording medium according to claim 4, wherein the carbon mask layer formed has a thickness in the range of 5 nm to 40 nm.

6. A method for producing a magnetic recording medium according to claim 1, wherein the formation of the negative pattern of the magnetic recording pattern on the resist layer in step (D1) is carried out by transfer printing using a stamp.

7. A method for producing a magnetic recording medium according to claim 1, which further comprises:

(H) a step of, after step (G1) for removing the residual resist layer, or the residual resist layer and mask layer, etching a surface layer portion of the magnetic layer by using an inert gas.

8. A method for producing a magnetic recording medium according to claim 1, wherein the reaction of the exposed regions of the magnetic layer with ozone in the step (F1) is effected by contacting the exposed regions of the magnetic layer with an ozone-containing aqueous solution.

* * * * *